US009516297B2

(12) United States Patent
Delacoux

(10) Patent No.: US 9,516,297 B2
(45) Date of Patent: Dec. 6, 2016

(54) METHOD AND DEVICE FOR MONITORING PHASE SHIFTING BETWEEN STEREOSCOPIC CAMERAS

(75) Inventor: Jacques Delacoux, Rueil-la-Gadeliere (FR)

(73) Assignee: TRANSVIDEO, Verneuil-sur-Avre (FR)

( * ) Notice: Subject to any disclaimer, the term of this patent is extended or adjusted under 35 U.S.C. 154(b) by 414 days.

(21) Appl. No.: 13/883,315

(22) PCT Filed: Nov. 3, 2011

(86) PCT No.: PCT/EP2011/069295
§ 371 (c)(1),
(2), (4) Date: May 3, 2013

(87) PCT Pub. No.: WO2012/059533
PCT Pub. Date: May 10, 2012

(65) Prior Publication Data
US 2013/0229497 A1 Sep. 5, 2013

(30) Foreign Application Priority Data
Nov. 5, 2010 (FR) ...................................... 10 59113

(51) Int. Cl.
H04N 13/02 (2006.01)
H04N 5/073 (2006.01)
(52) U.S. Cl.
CPC .......... H04N 13/0296 (2013.01); H04N 5/073 (2013.01)
(58) Field of Classification Search
CPC ..................................................... H04N 5/073
See application file for complete search history.

(56) References Cited

U.S. PATENT DOCUMENTS

| 4,532,547 | A | | 7/1985 | Bennett | |
|---|---|---|---|---|---|
| 5,416,510 | A | * | 5/1995 | Lipton | H04N 19/597 348/43 |
| 6,421,629 | B1 | * | 7/2002 | Ishiyama | G01B 11/255 702/159 |
| 7,233,349 | B2 | * | 6/2007 | Mauger | H04N 17/00 348/180 |
| 8,355,042 | B2 | * | 1/2013 | Lablans | G03B 37/00 348/36 |
| 8,436,893 | B2 | * | 5/2013 | McNamer | H04N 13/021 345/419 |
| 8,718,463 | B2 | * | 5/2014 | Kamiya et al. | 396/325 |
| 8,866,889 | B2 | * | 10/2014 | Masalkar | H04N 13/0022 348/46 |
| 9,128,293 | B2 | * | 9/2015 | Ohta | G06F 1/1637 |
| 9,143,766 | B2 | * | 9/2015 | Kim | H04N 13/0425 |

(Continued)

FOREIGN PATENT DOCUMENTS

EP 1 450 555 8/2004
EP 1 684 531 7/2006

OTHER PUBLICATIONS

International Search Report dated Mar. 23, 2012, corresponding to PCT/EP2011/069295.

Primary Examiner — Brian Yenke
(74) Attorney, Agent, or Firm — Young & Thompson

(57) ABSTRACT

A method and device for monitoring phase shifting between stereoscopic cameras. The device for monitoring phase shifting between the images from the stereoscopic cameras includes: a circuit (100) for characterizing the phase shift, which implements the method and is connected to the output terminals of the stereoscopic cameras (G, D); and a monitor (106) for displaying video images, including resources (63) for displaying the images (61, 62) one on top of the other, the image being generated by the cameras and resources (90, 94) for displaying the values (H, V) characterizing the phase shift in relation with the images.

14 Claims, 3 Drawing Sheets

(56) References Cited

U.S. PATENT DOCUMENTS

| | | | |
|---|---|---|---|
| 2005/0280702 A1* | 12/2005 | Nakano et al. | 348/42 |
| 2006/0204038 A1* | 9/2006 | Yokota et al. | 382/104 |
| 2007/0076112 A1* | 4/2007 | Nakano et al. | 348/311 |
| 2007/0081716 A1* | 4/2007 | Ha | H04N 13/0018 382/154 |
| 2007/0097224 A1 | 5/2007 | Haneda | |
| 2007/0146478 A1* | 6/2007 | Butler-Smith et al. | 348/47 |
| 2007/0165942 A1* | 7/2007 | Jin | H04N 13/0018 382/154 |
| 2007/0198189 A1* | 8/2007 | Herbin et al. | 701/300 |
| 2008/0049100 A1* | 2/2008 | Lipton et al. | 348/43 |
| 2008/0123938 A1* | 5/2008 | Kim | 382/154 |
| 2009/0051759 A1* | 2/2009 | Adkins | G02B 27/2264 348/53 |
| 2010/0245545 A1* | 9/2010 | Ilich-Toay | G11B 27/034 348/47 |
| 2010/0321472 A1* | 12/2010 | Kuwabara et al. | 348/43 |
| 2011/0254756 A1* | 10/2011 | Lee | G09G 3/003 345/9 |
| 2012/0019624 A1* | 1/2012 | Park et al. | 348/47 |
| 2012/0162386 A1* | 6/2012 | Kim et al. | 348/47 |
| 2012/0242806 A1* | 9/2012 | Ibrahim et al. | 348/47 |
| 2012/0274627 A1* | 11/2012 | Huggett et al. | 345/419 |
| 2013/0010144 A1* | 1/2013 | Park | G08B 13/19641 348/218.1 |
| 2015/0009288 A1* | 1/2015 | Wu et al. | 348/43 |
| 2015/0103149 A1* | 4/2015 | McNamer et al. | 348/50 |

* cited by examiner

METHOD AND DEVICE FOR MONITORING PHASE SHIFTING BETWEEN STEREOSCOPIC CAMERAS

TECHNICAL DOMAIN OF THE INVENTION

The present invention relates to a method for monitoring phase shifting between stereoscopic cameras. It also relates to a device for monitoring phase shifting between stereoscopic cameras to carry out the method according to the invention.

PRIOR ART

The prior art describes how to implement assemblies of two cameras, one of which takes an image corresponding to the image seen by the right eye and the other takes an image corresponding to the image seen by the left eye of a spectator of the scene which is to be captured as a stereoscopic image. The two image data streams captured in this way are recorded in synchronism, then reproduced on a display device by applying a predetermined rule for superimposing the two right and left images. The use of glasses also presents a stereoscopic representation to the spectator through stereoscopic reconstruction.

During the shooting of digital stereoscopic films, the stream of each of the two cameras is fed to a display device which directly superimposes the two left and right images. This display device is used by the cameraman to check that the right and left images have been captured, not only by adhering to the intended sequence of the film being shot, but also by monitoring technical parameters concerning, for example, luminosity or color balance. The cameras must be synchronous, not only to display the data, but also to record and obtain stereoscopic images devoid of kinetic artifacts.

It was noted that the synchronizable digital cameras used to produce pairs of stereoscopic images caused synchronization problems, to such an extent that most of the images taken revealed faults such that they had to be retaken. This results in a considerable extension of the time after which a satisfactory sequence, in terms of the synchronization between the right and left images, can be kept. The extension of the filming time causes many disadvantages due to deadlines and costs being overrun.

Moreover, if the two desynchronized right and left image streams are recorded as the images are captured, the images must then be resynchronized blindly during the editing of the different images. As a result, the editing and post-production operations may prove to be extremely laborious or even impossible and production costs and timescales are again increased.

However, pairs of cameras exist which are designed to exchange synchronization signals. Strictly speaking, these cameras should not suffer the aforementioned problem. Unfortunately, in practice, these cameras reveal severe desynchronization errors which require corrective action.

Finally, it must be noted that synchronization errors between the two cameras are not always visible during filming, on a control monitor used during filming. They sometimes prove to be erratic, and the problem comes to light during editing.

The present invention notably provides a solution to this problem of the prior art.

The document EP1684531 is known, which relates to a system for correcting geometric alignment errors of the two cameras of a stereoscopic vision on board a vehicle. As explained in this document, such a stereoscopic vision system is intended to perform distance measurements based on angular measurement in relation to a reference axis of the views of the same object on the right camera and on the left camera.

The very clear result of this is that an alignment error in the reference axis between the two right and left cameras prevents a precise measurement of the distance between the stereoscopic vision system and an object visible to the two cameras, and all the more so as the distance to the object increases.

The document U.S. Pat. No. 4,532,547 is also known, which relates to a system for outputting the video signals which originate from heterogeneous sources and which are to be mixed in a broadcasting studio. In this document, it is noted that there is no reason, other than fortuitous coincidence, for the content of the various video sources to originate from the same scene. The rationale of the teaching of this document is that the various video signals must be modulated onto one and the same broadcasting carrier, which then requires a phase alignment between each video source and the modulation carrier.

The document EP 1.450.555 is also known, which discloses the synchronization of the time bases of a plurality of analog video sources, essentially CCD cameras, which each transmit a composite analogue video signal to a video program broadcasting control room. The control room essentially contains a mixer which produces, on a link shared by the various cameras, a control signal intended to synchronize the various video sources on the basis of a clock synchronization.

BRIEF SUMMARY OF THE INVENTION

The invention proposes a method for monitoring phase shifting between stereoscopic cameras which consists in:
 measuring the phase difference between at least a part of a video signal originating from a first stereoscopic camera and the corresponding part of the video signal originating from at least one other stereoscopic camera;
 characterizing the synchronization error between the cameras monitored on the basis of said at least one phase difference;
 and using the characterization of the synchronization error to monitor said cameras, and/or the video signals originating from said cameras.
According to other characteristics of the method:
 the step of measuring the phase difference comprises a step for detecting a time reference of the first pixel of a digital video frame, of a digital video line or frame;
 the step of measuring the phase difference comprises a step for detecting a time reference of the start of a digital video line or frame;
 the step of characterization of the synchronization error comprises a step for counting the pixels being read belonging to a line and/or for counting the lines being read belonging to a frame produced by at least one of the cameras;
 the step of characterization of the synchronization error comprises a step for forming the difference between the instantaneous counting of the pixels of a line being captured of at least one camera and a first reference clock as the instantaneous counting of the pixels of a line being captured of at least one other camera and/or to form the difference between the instantaneous counting of the lines of a frame being read for capture of at least one camera and a first reference clock as the instantaneous counting of the lines of a frame being captured of at least one other camera;

the step for using the characterization of the phase shift between cameras comprises a step for reinitializing at least one of the video cameras at least when a value characterizing the synchronization error exceeds a determined threshold;

the step for using the characterization of the phase shift between cameras comprises a step for displaying on a display device a graphical representation of the characterization of the phase shift of at least one of the images of one of said cameras in relation to a phase reference as the signal of another camera;

the step for using the characterization of the phase shift between cameras comprises a step for recording the streams of the digital images on digital memories, then reading them in synchronism by shifting the reading of at least one of the recorded images of the characterization value of its phase shift in relation to the readings of the other recorded images;

the step for using the characterization of the phase shift comprises a step for recording the reading streams of the resynchronized digital images;

the step for using the characterization of the phase shift between cameras comprises a step for adding information concerning the instantaneous phase shift recorded for at least a part of the reading data to the reading data of the resynchronized digital images.

The invention also proposes a device for monitoring the phase shifting for monitoring the phase shifting between the images originating from stereoscopic cameras characterized in that it comprises:

a phase shift characterization circuit carrying out the method according to the invention and connected to the output terminals of said stereoscopic cameras;

a video image display monitor comprising resources for the superimposed display of the images generated by said cameras and resources to display values characterizing said phase shift in relation to said images.

According to other characteristics of the device:

the resources for displaying values characterizing said phase shift comprise at least a generator of graphical symbols of the instantaneous phase of at least one image, a circuit to display said graphical symbols in an instantaneous position representing the instantaneous phase and/or a circuit to display an alphanumeric value representing said instantaneous phase and/or the instantaneous phase shift, and the resources for displaying values characterizing said phase shift are associated with a horizontal shift and/or a vertical shift of the images of the associated cameras;

the monitoring device furthermore comprises a circuit for triggering at least one signal to re-initialize at least one of the associated video cameras connected to the phase shift characterization circuit which comprises a circuit for testing at least one phase value and/or phase shift value at a programmed threshold value for triggering a reinitialization signal transmitted to at least one camera;

the phase shift characterization circuit comprises a means for reading in resynchronization the signals representing the images produced by said cameras, which is connected to a recorder of the signals representing the images produced by said cameras and resynchronized;

the phase shift characterization circuit comprises a means for producing metadata describing at least a part of the instantaneous phase shifts and recording them with the signals representing the images produced by said cameras and/or resynchronized.

BRIEF DESCRIPTION OF THE FIGURES

Other characteristics and advantages of the present invention will be better understood with reference to the description and the attached drawings, in which.

DETAILED DESCRIPTION OF THE FIGURES

Figure 1:
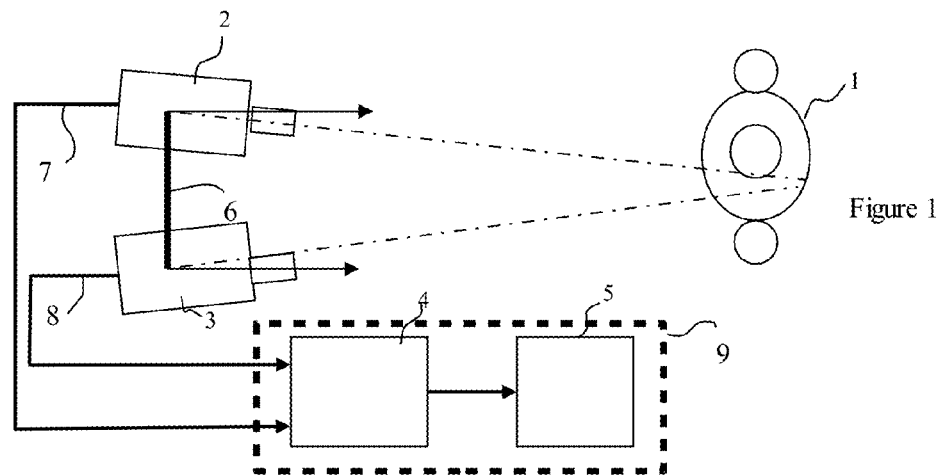
FIG. 1 shows a block diagram of a stereoscopic imaging system used in the context of the present invention.
Figure 2:
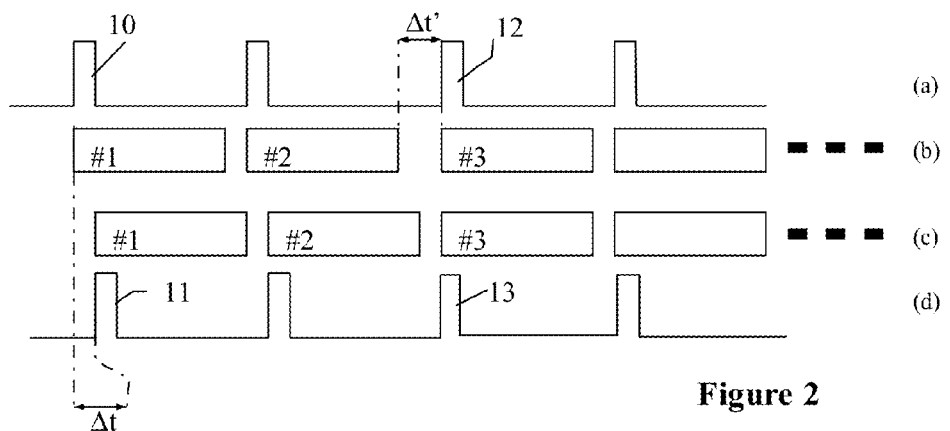
FIGS. 2(a) to 2(d) show chronograms of signals used in the context of the present invention.

FIG. 1 shows a block diagram of a stereoscopic imaging system used in the context of the present invention. A subject 1 is placed in the superimposition of the fields of view of two stereoscopic cameras 2 and 3. The two cameras are mounted on a stereoscopic base 6 with suitable angulations in relation to reference axes and imaging signals 7 and 8 are produced by the two cameras. Systems exist which involve a different number of cameras, to which the present invention also applies.

In the most recent applications, the cameras are digital video cameras which produce streams of images organized into frames of lines. Each line is made up of a plurality of pixels which combine a plurality of digital values such as color components. Digital data recorded in the stream allows the pixels, lines and frames to be recognized.

Similarly, the fact of pairing two digital video cameras on one stereoscopic base is well known in the prior art. It was very soon realized that the two cameras needed to be synchronized in such a way that the two left and right image streams could be displayed at corresponding times. Also, some technically advanced cameras comprise synchronization inputs-outputs such that at least one frame start signal is shared between the two digital video cameras. However, such cameras are very expensive and digital video cameras without shared synchronization are commonly used for stereoscopic imaging. Furthermore, in the case of digital video cameras with shared synchronization, drifts occur which render synchronization difficult, and it is common for the right and left image streams, although transmitted with shared synchronization on the two cameras, to be quickly and permanently desynchronized.

The digital signals 7 and 8 produced by the two cameras represent right and left image signals. They are transmitted in a known manner to a monitor 9 for checking the images which are available, for example, to the cameraman, the director and/or the photography director to allow them to check the quality of the images taken. It is then customary to provide these persons with tools for evaluating the technical characteristics of the image shown on the monitor 9 per se, such as color or brightness histograms.

According to the invention, the monitor 9, when it is adapted to display stereoscopic images, comprises a circuit 4 to calculate the phase shift between the right and left image signals in such a way as to characterize the synchronization error between the two right and left frame streams, and a display screen 5 which receives, on the one hand, the frame signals 7 and 8 and synchronization error parameters which are then displayed together on the display screen 5 of the monitor 9. The persons supervising the stereoscopic imaging then have equipment allowing them to decide whether or not the filming of the stereoscopic images is correct in terms of their synchronization. If the synchronization is incorrect, errors appear in the right and left superimposed images from the stereoscopic filming, which will be described later. If the persons detect such a situation, it is then decided to take action to correct the synchronization by reinitializing at least one of the two cameras. Thus, if the synchronization measurement time reference is taken on the left image frame, the right imaging camera will be reinitialized. The operation is repeated until the synchronization error is sufficiently reduced.

In a different embodiment not shown in FIG. 1, the synchronization error detection circuit 4 interworks with a device which calculates the period of time required to resynchronize the two cameras. The synchronization error characterization is then used to rephase the images captured by the two cameras.

In a different embodiment not shown in FIG. 1, the synchronization error detection circuit 4 interworks with a device allowing a resynchronized stream to be produced in such a way that two correctly resynchronized right and left streams are provided downstream of the monitor 9, as will be described below. The synchronization error characterization is then used to rephase the desynchronized streams of the two cameras and allow them to be recorded on a memory medium for processing in the editing of the different images.

In a different embodiment not shown in FIG. 1, the synchronization error detection circuit 4 interworks with a device which identifies the phase differences between the two images and generates metadata which are added to the right and/or left video data streams according to the type of phase shift employed, in such a way that, once recorded, the streams can be resynchronized on editing. It is also possible to include these synchronization error metadata in the recording of the resynchronized streams according to the present invention in such a way that the information can be available for additional processing on editing. The synchronization error characterization is then used to inform production of the sequence of stereoscopic images to allow it to take appropriate measures on the basis of the phase shift metadata.

FIGS. 2(a) to 2(d) show chronograms of signals used in the context of the present invention. The diagram (b) shows a chronogram of the successive pixels of a line of a right frame and the diagram (c) shows a chronogram of the successive pixels of a line of a left frame. In theory, the two chronograms should overlap exactly in time. Pulses (10-13) corresponding to the start times of each pixel of each frame are marked in the chronograms (a) to (d). Thus, the pixel #1 of the line of a right frame (b) corresponds to a pulse 10 which is delayed in relation to the pixel #1 of the line of a left frame (c) which corresponds to a pulse 11 (chronogram (d)). The value of the delay Dt is a characterization of the synchronization error of the two cameras. More precisely, it corresponds to a mismatching in the direction of the lines of the frame and therefore in the horizontal direction. This desynchronization is verified by a shift to the right or the left of the two right and left images when they are superimposed on the screen 5 of the monitor 9.

In practice, much greater horizontal desynchronization values exist which are expressed in hundreds of pixels for lines of more than one thousand pixels. In this case, the phase shift characterization consists in counting the pixels as from the first pixel of each line detected in a known manner, and in measuring the horizontal synchronization error H by means of the instantaneous difference between the two counters. These values may change through time and may correspond to more or less severe errors in the sequence of stereoscopic images.

Thus, on the chronogram (b), the pixel #3 has been shown with a delay Dt' in relation to the end of the preceding pixel #2. The delay is such that the pixel #3 of the line of the left frame (c) has returned to a temporal position on the pixel #3 of the line of the right frame (b). The pulse 13 is then synchronous with the corresponding pulse 12. The synchronization error can thus be seen to change through time.

FIGS. 3(a) to 3(c) show streams of digital video frames used in the context of the present invention. The diagram (a) shows the start of a stream of frames of left video images, the diagram (a) shows the start of a stream of frames of right video images and diagram (c) shows the start of a stream of frames of video images superimposed without frame synchronization. The first frame 16 of the left frame stream temporally precedes the first frame 18 of the right frame stream, the start times of each of these frames being shifted, in 15 and 17 respectively. If the two images are superimposed or juxtaposed without correction, this can be locked onto a time 21, which has been shown to correspond to the time 15 of the first frame 16 of the left frame stream.

In different embodiments, the time 21 of starting the superimposition of the right and left images can be locked onto a different event according to a different clock, such as a clock started by the detection or recording of a stereoscopic imaging start "clap". In this case, the phases in the pixels, the lines or the frames will be calculated from this common time reference and each phase shift will change with each right or left image stream. This will then provide a synchronization correction with an absolute clock.

Figure 3:
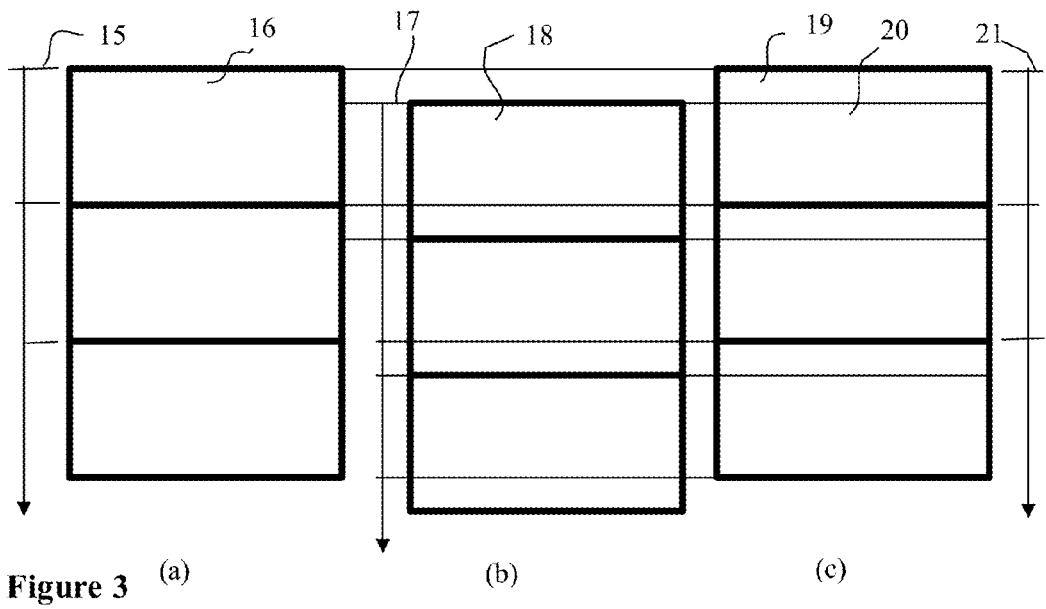
FIGS. 3(a) to 3(c) show streams of digital video frames used in the context of the present invention.

Conversely, in the case shown in diagram (c) of FIG. 3, the left frame stream of diagram (a) is taken as the reference clock and the phase differences are calculated on the right image stream (diagram (b)) in relation to the left image stream (diagram (a)).

In the absence of a resynchronization operation, the superimposition of the left and right frames in diagram (c) leads to the superimposition of elements of the same scene which do not correspond to one another in the stereoscopy. Thus, the first superimposition frame starts with the first lines of the first left frame 16 between times 15 and 17. Then, the continuation of the frame 16 is superimposed with the start of the right frame 18 and so on. The characterization of the synchronization error in the vertical direction, understood here to mean on the frame start times, is represented by a vertical shift. It is accurately measured by the number of lines since the detection of each right or left frame start. A vertical synchronization error characterization is then obtained by establishing the difference between the counted values.

Figure 4:
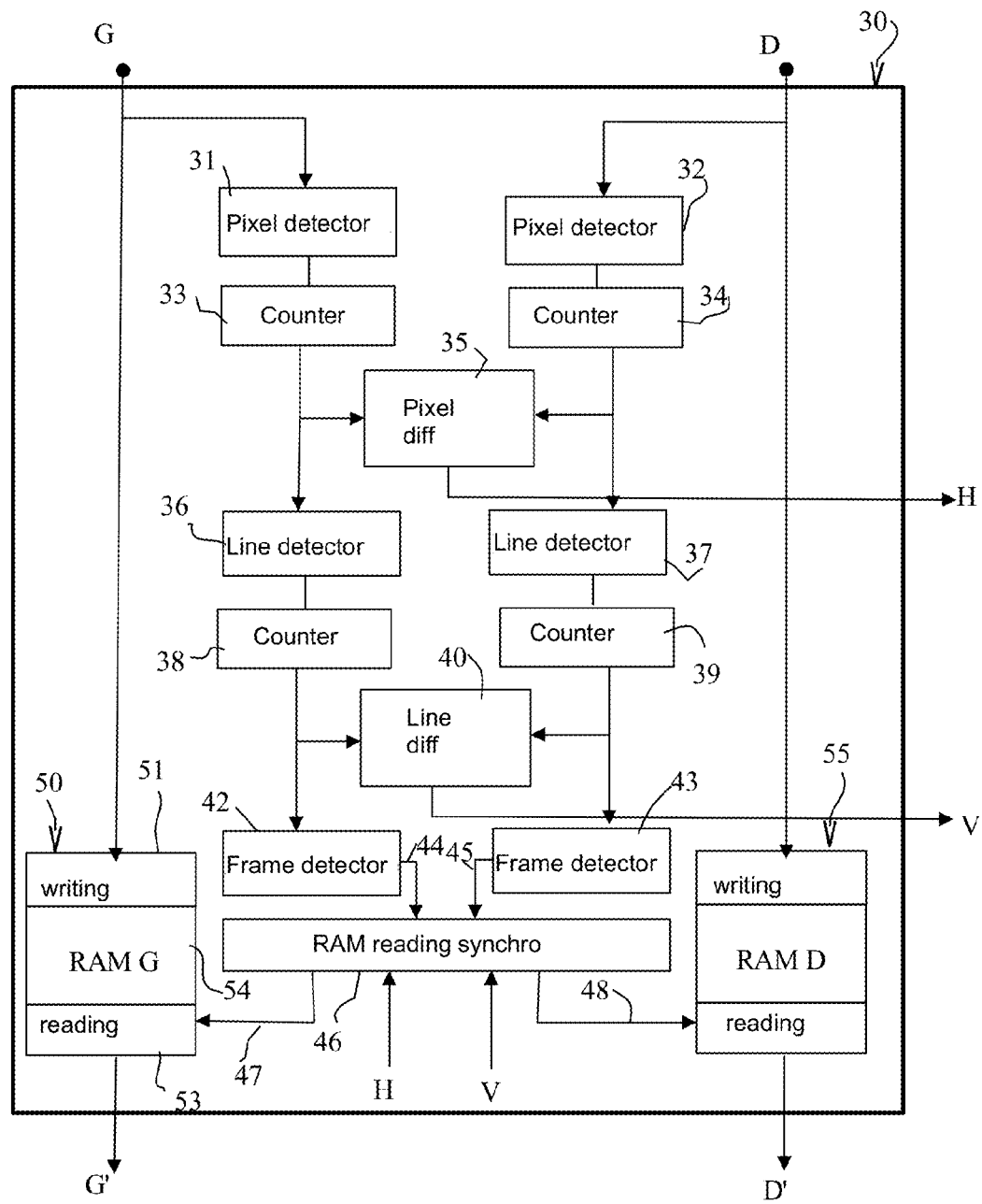
FIG. 4 shows a block diagram of a part of a monitoring device in a particular embodiment of the present invention.

FIG. 4 shows a block diagram of a part of a monitoring device in a particular embodiment of the present invention. The outputs of the cameras 2 and 3 (FIG. 1) are connected to the inputs G and D of the left and right frames respectively. The circuit 30 shown in FIG. 4 comprises two output pairs which are:

output terminals H and V of the characterization of the synchronization error between the right and left frames, in both the horizontal direction of the lines H and the vertical direction of the frames V;

and output terminals G' and D' of the resynchronized frame streams as a function of the synchronism error characterization (H, V).

The circuit 30 is made up of two more or less identical branches. Each left frame stream G or right frame stream D is loaded by a write port 51 of a dual-port memory 50 or 55. The frame signal G is decoded in a pixel detector 31 (32 for the right stream D) which allows a pixel counter 33 to be incremented in the current line (34 for the lines of the frame D).

The instantaneous values of the counters 33 and 34 are subtracted in a circuit for calculating pixel differences 35, which thus produces a characterization of a synchronization error in the horizontal direction H available at its output.

Similarly, a line detector 36 in the frame G (or 37 in the right frame D) is connected to the incrementation input of a line counter 38 (or 39 for the right frame D).

The instantaneous values of the counters 38 and 39 are subtracted in a circuit for calculating line differences 40, which thus produces a characterization of a synchronization error in the vertical direction V available at its output.

A characterization of the synchronization error of the left images G and the right images D has thus been produced by the datum of the two characterizations H and V. These characterizations H and V are available at outputs of the circuit 30, and are thus fed to control inputs of a circuit 46 generating a read synchronization of the RAM memories G 50 and D 55.

The circuit 30 also comprises a frame detector 42 to detect the frame starts 44 on the frames G (or 43 to detect the frame starts 45 on frames D) to initialize the synchronization-generating circuit 46 which, in response, produces read signals 47 on the read port 53 of the memory 50 and 48 on the corresponding read port of the memory 55, each of these read ports then producing resynchronized frame streams G' and right frame streams D'.

In one embodiment, the phase difference being locked onto the phase of the left frame stream G, the reading D' of the memory 55 is shifted only to obtain the correct synchronism on the left frame stream G' identical to the original stream G.

In a different embodiment, the phase difference being taken by reference to an external clock (not shown in FIG. 4), the two streams G' and D' are symmetrically locked once more onto this clock reference.

Figure 5:
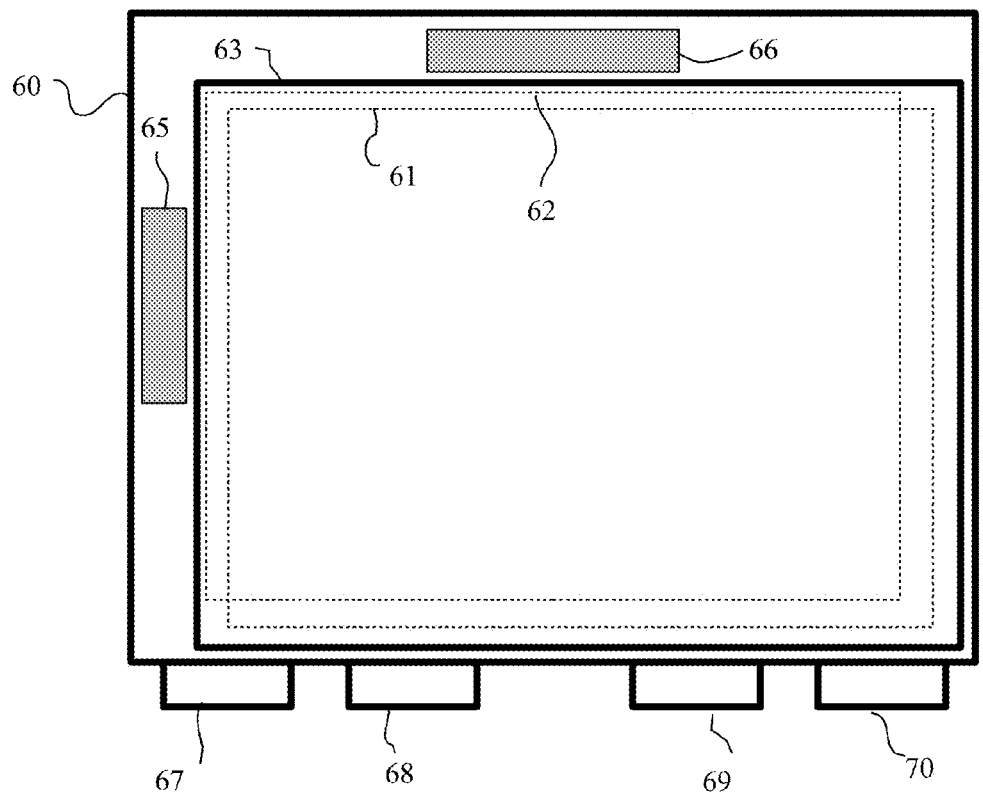
FIG. 5 shows a top view of a different part of a monitoring device in a particular embodiment of the present invention.

FIG. 5 shows the view of a display device 60 used in a monitor such as the monitor 5 (FIG. 1). The display device 60 comprises an area 63 in which the two left 62 and right 61 images are superimposed with their shifts caused by the synchronization error which has been characterized as explained above.

These images 62 and 63 are managed on the basis of the video signals originating from the stereoscopic cameras to which the display or control monitor is connected. The management is performed by electronic resources (graphical processor) for the superimposed display of the images generated by said cameras.

Two upper and left borders are provided on the edges of the area 63 to display a graphical user interface to show the characterization of the synchronization error. A first user interface 65 is disposed in the left border, allowing the user to visualize the vertical characterization V of the synchronization error. A second user interface 66 is disposed in the upper border, allowing the user to visualize the horizontal characterization H of the synchronization error.

The two user interfaces 65 and 66 are generated by resources to display values characterizing the phase shift or synchronization error. These user interfaces 65 and 66 operate in the form of icons or graphical objects generated by a graphical processor belonging to the resources to display the characterization values. This display furthermore follows the visualization of the two images 62 and 63.

The display device 60 furthermore comprises a plurality of connectors, including notably a pair of video connectors 67 and 68 to receive the original right and left frame streams of the stereoscopic cameras, and a pair of video connectors 69 and 70 to transmit the resynchronized right and left frame streams to a user device, notably with the aid of the circuit 30 described in FIG. 4. These resynchronized streams may be available in different individual or spatially and temporally multiplexed configurations.

The display device 60 may be adapted to a radiofrequency interface to receive the original right and left frame streams of the stereoscopic cameras. It may be adapted to a recorder of the resynchronized right and left frame streams.

Figure 6:
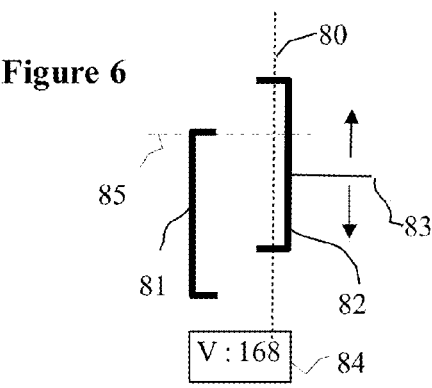
FIG. 6 shows a diagram of a part displayed in a monitoring device in a particular embodiment of the present invention.

FIG. 6 shows a particular embodiment of a graphical user interface used in the graphical user interface 65 adapted to the vertical direction shown in FIG. 5. It is understood that the graphical user interface 66 may be made up in the same way by rotating the symbols through 90° to adapt them to the horizontal direction. The graphical user interface comprises two brackets, 81 adapted to the left image and 82 adapted to the right image respectively. In the case where the synchronization error characterization is performed in relation to the left image, only the bracket 82 associated with the right image is vertically mobile on the display due to the effect of the updating of the instantaneous position controlled by the vertical phase shift value established, for example, with the aid of the circuit 30, as shown in FIG. 4. In this embodiment, the bracket 81 of the left image remains bracketed to the horizontal line 85, since it serves as a temporal reference to the measurement of the phase shift between the right and left images.

In one embodiment in which the phase differences are established in relation to an external clock, the bracket 81 of the phase of the left image moves instantaneously as a function of its own phase in parallel with the direction 80 of translation of the bracket 82 of the phase of the right image.

An effective means is thus provided for evaluating the phase difference between the two images and thus characterizing the synchronization error in the vertical direction. The same user interface 66 being provided in the horizontal direction, the synchronization error is carefully monitored.

The user interface is complemented by the display in a box 84 of alphanumeric values indicating the number of lines of shift in the vertical direction V of the right image in relation to the left image, taken as a reference. The same box can be provided on the user interface 66 of the horizontal direction, where the displayed value corresponds to the number of pixels of horizontal shift H.

In one embodiment, the monitoring method comprises a step of using the characterization of the phase shift which uses the manual triggering of the reinitialization of the right camera, the left camera producing the reference time signal. Once the reinitialization has been performed, it is possible to check whether the synchronism error has been improved. Otherwise, the reinitialization operation can be restarted. It must be noted that this forced resynchronization may be carried out before the start of the filming on a simple scene.

Figure 7:
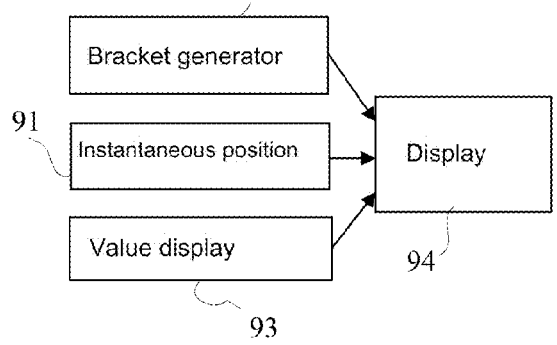
FIG. 7 shows a diagram of a part of a monitoring device in a particular embodiment of the present invention to display the part shown in FIGS. 6.

FIG. 7 shows resources 90, 94 for displaying characterization values (H, V) of the phase shift in relation to the stereoscopic images displayed. They comprise at least a generator of graphical symbols 90 of the instantaneous phase of at least one image, a circuit to display said graphical symbols and an instantaneous position representing the instantaneous phase 91 and/or a circuit to display an alphanumeric value representing said instantaneous phase and/or the instantaneous phase shift 92. These three components for each graphical interface 65 or 66 are connected to the display resources per se 94, in such a way that the graphical symbols, such as the brackets 81 and 82 (FIG. 6) are mobilized according to the detected phase variations. The resources for displaying values characterizing said phase shift are associated with a horizontal shift and/or a vertical shift of the images of the associated cameras and are updated at each display time.

Graphical symbols other than the brackets such as the brackets 81, 82 can be generated by the generator 90. In particular, arrows facing one another can be used. At least one of the arrows can be mobile under the control of the circuit 91 indicating its instantaneous position.

Figure 8:
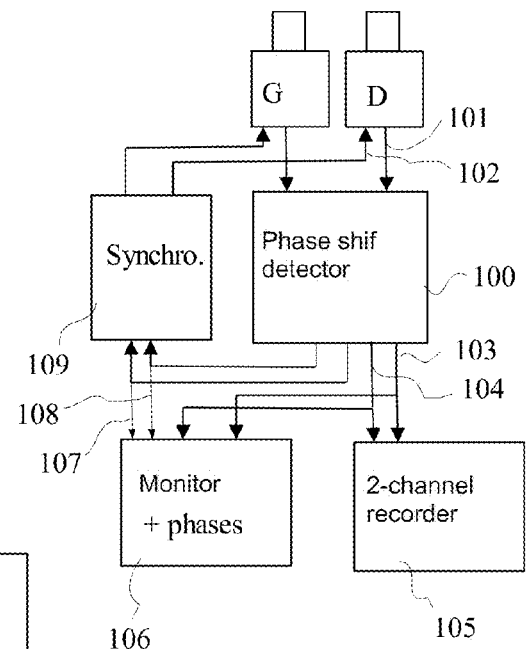
FIG. 8 shows a block diagram of a different embodiment of a monitoring device according to the present invention.

FIG. 8 shows a different embodiment of a device for monitoring the phase shifting of the stereoscopic images according to the invention. The two cameras G and D are connected in such a way as to transmit the original frame streams to the phase shift detection circuit 100 which can be implemented according to the instruction previously given in FIG. 4. The left and right streams resynchronized by the phase shift detection circuit 100 are fed to the input of a dual-channel recorder 105.

Metadata representing the instantaneous phase shifts, or some of them, can also be added to the resynchronized streams to be recorded by the dual-channel recorder 105.

The resynchronized streams and/or the original streams (not shown in FIG. 8) can be transmitted to the input of a display monitor 106 which also receives the data characterizing the phase shifts 107 and 108 or synchronization errors in the two horizontal and vertical directions. These data are processed for display on the monitor 106, as explained with reference to FIGS. 5 to 7. They are also transmitted to the inputs of a synchronization generator which generates at least one reinitialization signal 102 of at least one of the cameras G or D if the phase shift characterization data 107 and 108 exceed programmed thresholds.

Key To Drawings
FIG. 4

| Reference number | English |
|---|---|
| 31 & 32 | Pixel detector |
| 33, 34, 38 & 39 | Counter |
| 35 | Pixel diff |
| 36 & 37 | Line detector |
| 40 | Line diff |
| 42 & 43 | Frame detector |
| 46 | RAM reading synchro |
| 50 | writing RAM G reading |
| 55 | writing RAM D reading |

FIG. 7

| Reference number | English |
|---|---|
| 90 | Bracket generator |
| 91 | Instantaneous position |
| 93 | Value display |
| 94 | Display |

FIG. 8

| Reference number | English |
|---|---|
| 100 | Phase shift detector |
| 105 | 2-channel recorder |
| 106 | Monitor + phases |
| 109 | Synchro. |

The invention claimed is:

1. A method for monitoring phase shifting between stereoscopic cameras (2, 3), which comprises:

connecting a video output of a first video stereoscopic camera (2) to a first input of a video image display monitor, and connecting a video output of a second video stereoscopic camera (2) to a second input of the video image display monitor, the video image display monitor comprising i) a phase shift characterization circuit (100) connected to said first and second inputs to receive video signals from said stereoscopic first and second cameras, ii) a display screen operatively connected to the phase shift characterization circuit (100), and iii) electronic resources for display (63) of images (61, 62) generated by said received video signals from said stereoscopic first and second cameras and further electronic resources for display of characterization values (H, V) of phase shift in relation to images from said stereoscopic first and second cameras displayed on said display screen, wherein said electronic resources for display (63) of images (61, 62) comprise a graphical processor and a display area (63) of a display device (60), and said further electronic resources for display of characterization values (H, V) of phase shift comprises at least one of the group consisting of i) a generator of graphical symbols (90), and a circuit to display said graphical symbols (91) and ii) a circuit to display an alphanumeric value;

during filming a stereoscopic scene, monitoring, on the display screen, images generated by said received video signals from said stereoscopic first and second cameras;

during the filming of the stereoscopic scene, measuring, with the phase shift characterization circuit (100), a phase difference (Dt) between at least a part (10) of the received video signal originating from the first stereoscopic camera (2) and a time reference as a corresponding part (11) of the received video signal originating from the second stereoscopic camera (3);

characterizing, with the phase shift characterization circuit (100), a synchronization error (H, D) between the first and second cameras being monitored on the basis of said phase difference; and using said electronic resources for display (63) of images (61, 62), said further electronic resources for display of characterization values (H, V) of phase shift, and the characterization of the synchronization error to monitor said cameras and the video signals originating from said first and second cameras, said monitoring including i) displaying on the display screen, a first video sequence from the video signal of the first camera and a second video sequence from the video signal of the second camera, and ii) using the characterization of the synchronization error (H, D), displaying on the display screen, synchronization error parameters superimposed on the first and second video sequences.

2. The method as claimed in claim 1, wherein the step of measuring the phase difference comprises a step for detecting a time reference of the first pixel of a digital video frame, of a digital video line or frame.

3. The method as claimed in claim 1, wherein the step of measuring the phase difference comprises a step for detecting a time reference of the start of a digital video line or frame.

4. The method as claimed in claim 1, wherein the step of characterization of the synchronization error comprises a step for counting the pixels being read belonging to a line and/or for counting the lines being read belonging to a frame produced by at least one of the cameras.

5. The method as claimed in claim 1, wherein the step of characterization of the synchronization error comprises a step for forming the difference between the instantaneous counting of the pixels of a line being captured of the first camera and a first reference clock as the instantaneous counting of the pixels of a line being captured of the second camera and/or to form the difference between the instantaneous counting of the lines of a frame being read for capture of the first camera and a first reference clock as the instantaneous counting of the lines of a frame being captured of the second camera.

6. The method as claimed in claim 1, wherein the step for using the characterization of the phase shift between the first and second cameras comprises a step for reinitializing at least one of the first and second cameras at least when a value characterizing the synchronization error exceeds a determined threshold, the first and second being video cameras.

7. The method as claimed in claim 1, wherein the step for using the characterization of the phase shift between the first and second cameras comprises a step for displaying on a display device a graphical representation of the characterization of the phase shift of at least one of the images of one of said first and second cameras in relation to a phase reference as the signal of another camera.

8. The method as claimed in claim 1, wherein the step for using the characterization of the phase shift between the first and second cameras comprises a step for recording the original streams of the digital images on digital memories, then reading them in synchronism by shifting the reading of at least one of the recorded images of the characterization value of its phase shift in relation to the readings of the other recorded images.

9. The method as claimed in claim 1, wherein the step for using the characterization of the phase shift comprises a step for recording the reading streams of the resynchronized digital images.

10. The method as claimed in claim 1, wherein the step for using the characterization of the phase shift between the first and second cameras comprises a step for adding information concerning the instantaneous phase shift recorded for at least a part of the reading data to the reading data of the resynchronized digital images.

11. The method as claimed in claim 1, wherein the further electronic resources for display of characterization values (H, V) of phase shift comprise the generator of graphical symbols (90), the graphical symbols (90) being of the instantaneous phase of at least one image, the circuit to display said graphical symbols, the display being in an instantaneous position representing the instantaneous phase (91) and the circuit to display an alphanumeric value, the alphanumeric value representing said instantaneous phase and/or the instantaneous phase shift (92), and the further electronic resources are associated with a horizontal shift and/or a vertical shift of the images of the associated first and second video stereoscopic cameras.

12. The method as claimed in claim 1, further using a circuit for triggering at least one signal (109) to re-initialize at least one of the associated first and second video stereoscopic cameras connected to the phase shift characterization circuit (100) which comprises a circuit for testing at least one phase value and/or phase shift value at a programmed threshold value for triggering a reinitialization signal transmitted to at least one camera.

13. The method as claimed in claim 1, wherein the phase shift characterization circuit (100) comprises a means (46, 50, 55) for reading in resynchronization the signals (G', D') representing the images produced by said cameras, which is connected to a recorder (105) of the signals representing the images produced by said cameras and resynchronized.

14. The method as claimed in claim 1, wherein the phase shift characterization circuit (100) comprises a means for producing metadata describing at least a part of the instantaneous phase shifts and recording them with the signals representing the images produced by said cameras (G, D) and/or resynchronized (G', D').

* * * * *